(12) United States Patent
Fujisawa et al.

(10) Patent No.: US 7,815,976 B2
(45) Date of Patent: Oct. 19, 2010

(54) METHOD FOR MANUFACTURING ORGANIC RESIN-COATED METAL SHEET AND APPARATUS OF MANUFACTURING ORGANIC RESIN-COATED METAL SHEET

(75) Inventors: Kenichi Fujisawa, Yamaguchi (JP); Takuji Nakamura, Yamaguchi (JP); Hiroshi Inazawa, Yamaguchi (JP); Norimasa Maida, Yamaguchi (JP); Yasuhiro Matsubara, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 266 days.

(21) Appl. No.: 12/088,786

(22) PCT Filed: Sep. 26, 2006

(86) PCT No.: PCT/JP2006/319050
§ 371 (c)(1),
(2), (4) Date: Jul. 21, 2008

(87) PCT Pub. No.: WO2007/037225
PCT Pub. Date: Apr. 5, 2007

(65) Prior Publication Data
US 2009/0068353 A1    Mar. 12, 2009

(30) Foreign Application Priority Data
Sep. 29, 2005    (JP)  ............................ 2005-283225

(51) Int. Cl.
*B05D 1/26*    (2006.01)
*B05C 5/02*    (2006.01)
*B29C 47/12*    (2006.01)

(52) U.S. Cl. ....................... 427/458; 427/472; 427/473; 118/621; 118/623; 118/624

(58) Field of Classification Search ................. 427/458, 427/472, 473; 118/621, 623, 624
See application file for complete search history.

(56) References Cited

U.S. PATENT DOCUMENTS

| | | | | |
|---|---|---|---|---|
| 5,094,792 A | * | 3/1992 | Baran | 264/171.17 |
| 5,985,080 A | * | 11/1999 | Kobayashi et al. | 156/244.24 |
| 6,551,434 B1 | * | 4/2003 | Yamada et al. | 156/244.23 |
| 6,758,903 B2 | * | 7/2004 | Levendusky et al. | 118/67 |

FOREIGN PATENT DOCUMENTS

| | | | |
|---|---|---|---|
| JP | 10-100234 | * | 4/1998 |
| JP | 2001-252965 | | 9/2001 |
| JP | 2001-341196 | | 12/2001 |
| JP | 2003-071922 | | 3/2003 |
| JP | 2004-009458 | | 1/2004 |
| JP | 2004-025639 | | 1/2004 |
| JP | 2004-025640 | | 1/2004 |

* cited by examiner

*Primary Examiner*—Frederick J Parker
(74) *Attorney, Agent, or Firm*—Browdy and Neimark, PLLC

(57) ABSTRACT

A method and apparatus for manufacturing a resin coated metal sheet. The method includes extruding a molten organic resin by heating from a T-die onto a metal sheet; dropping molten resin onto pre-rolls arranged between the T-die and lamination rolls, and bringing the molten resin in contact with the pre-rolls; and pressing the molten resin and the metal sheet by the lamination rolls to manufacture the resin-coated metal sheet. Electrically conductive bodies are arranged parallel to the widthwise direction of the pre-rolls, and the molten resin is dropped onto the pre-rolls in a state that an electric current is supplied to the conductive bodies, bringing the molten resin into contact with the pre-rolls by electrostatic pinning whereby an oligomer adhered to the pre-rolls is transferred to the surface of the molten resin and removed.

2 Claims, 2 Drawing Sheets

METHOD FOR MANUFACTURING ORGANIC RESIN-COATED METAL SHEET AND APPARATUS OF MANUFACTURING ORGANIC RESIN-COATED METAL SHEET

TECHNICAL FIELD

The present invention relates to, in a method of manufacturing an organic resin-coated metal sheet by an extrusion lamination method, a method of removing an oligomer adhered to a roll and an apparatus of manufacturing an organic resin-coated metal sheet capable of applying an organic resin to a metal sheet while removing the oligomer.

BACKGROUND ART

Conventionally, an organic resin-coated metal sheet which is formed by directly applying an organic resin in a molten state by heating to a metal sheet is manufactured using a manufacturing method and a manufacturing apparatus shown in FIG. 2, for example.

That is, the manufacturing method includes following steps.

1) An elongated strip-shaped metal sheet 1 is continuously fed (downwardly in the drawing) from a metal-sheet supply means not shown in the drawing.

2) An organic resin 2 in a molten state by heating using a heating/melting means not shown in the drawing is discharged from a die lip of a T-die 3, and the organic resin 2 in a molten state by heating extruded in a film shape is allowed to drop on surfaces of pre-rolls 4 arranged between the T-die 3 and lamination rolls 5 for decreasing a neck-in phenomenon of the organic resin 2 thus making a thickness of the film uniform. In the drawing, an arrow indicates the traveling direction of the metal sheet.

3) The organic resin 2 in a molten state by heating which is allowed to drop on the surfaces of the pre-rolls 4 and is brought into contact with the surfaces of the pre-rolls 4 is introduced to the continuously-fed metal sheet 1. Using a pair of lamination rolls 5 arranged immediately downstream of the pre-rolls 4, the metal sheet 1 and the organic resin 2 are nipped and compression-bonded to each other so that an organic resin film is laminated to both surfaces of the metal sheet 1 thus manufacturing an organic-resin coated metal sheet 10.

In manufacturing the organic-resin coated metal sheet using such a conventional manufacturing method, when the organic resin 2 in a molten state by heating is continuously discharged from the T-die 3 and is dropped on and brought into contact with the surfaces of the pre-rolls 4, an oligomer in the molten resin is continuously laminated to the surfaces of the pre-rolls 4. When a predetermined quantity or more of the oligomer is laminated to the surfaces of the pre-rolls 4, the oligomer partially falls as a block and adheres to the molten resin and hence, the oligomer in a block shape adheres to the metal sheet 1 thus causing a serious deterioration in quality. In a step of directly manufacturing a resin film or a resin sheet by continuously discharging an organic resin in a molten state by heating from a T-die, it is possible to ensure a space sufficient for installing a removing device such as a brush or a suction device for cleaning rolls in the vicinity of forming rolls or cooling rolls and hence, an oligomer which adheres to these rolls can be continuously removed without stopping the manufacturing step. However, in a so-called manufacturing step of an extruded lamination material which continuously discharges an organic resin from a T-die and laminates the organic resin to a metal sheet, it is difficult to ensure a space for installing such a removing device. Accordingly, it is necessary to remove an oligomer adhered to rolls by frequently stopping the manufacturing step thus lowering the productivity of an organic-resin coated metal sheet.

As a method of removing an adhered material on a surface of a roll used in the manufacture of a thermoplastic resin film, patent document 1 proposes a method which removes the adhered material by radiating ultraviolet rays to the surface of the roll. Although this method can sufficiently remove an oligomer laminated to a stretching roller used for stretching the thermoplastic resin film in the longitudinal direction and precipitating in a state that the resin is solidified, the method cannot sufficiently remove an oligomer precipitating on a pre-roll with which a resin in a molten state by heating come into contact.

As patent document which discloses the related art, the following document is known.

Patent document 1: JP-A-2001-341196

DISCLOSURE OF THE INVENTION

Problems that the Invention is to Solve

It is an object of the present invention to provide particularly, in a method of manufacturing an organic resin-coated metal sheet by an extrusion lamination method, a method of removing an oligomer adhered to a roll with which a heat molten resin comes into contact and an apparatus of manufacturing an organic resin-coated metal sheet while removing an oligomer.

Means for Solving the Problems

To achieve the above-mentioned object, in a manufacturing method of an organic-resin coated metal sheet (claim 1) which includes the steps of: continuously extruding an organic resin in a molten state by heating from a T-die in a film shape onto an elongated strip-shaped metal sheet; dropping a molten resin on pre-rolls arranged between the T-die and lamination rolls and bringing the molten resin into contact with the pre-rolls; and pressing the molten resin and the metal sheet by lamination rolls thus manufacturing the organic-resin coated metal sheet, an oligomer removing method is characterized in that electric conductive bodies are arranged parallel to the widthwise direction of the pre-rolls, and the molten resin is dropped onto the pre-rolls in a state that an electric current is supplied to the electric conductive bodies at predetermined time intervals thus bringing the molten resin into contact with surfaces of the pre-rolls by electrostatic pinning whereby an oligomer adhered to the pre-rolls is transferred to a surface of the molten resin and is removed.

Further, a manufacturing apparatus of an organic-resin coated metal sheet of the present invention (claim 2) includes: a means for feeding a metal sheet; a means for melting an organic resin by heating; a T-die; pre-rolls; electric conductive bodies arranged parallel in the widthwise direction of the pre-rolls; an electricity supply means for supplying an electric current to the electric conductive bodies; and lamination rolls, wherein the organic resin is applied to the metal sheet while removing an oligomer adhered to the pre-rolls by way of following steps 1) to 4).

1) continuously feeding an elongated strip-shaped metal sheet from a means for feeding the metal sheet, 2) discharging the organic resin in a molten state by heating using a heating/melting means from a die lip of the T-die and dropping the molten resin onto surfaces of the pre-rolls arranged directly upstream of the lamination rolls, 3) dropping the molten resin onto the pre-rolls in a state that an electric current is supplied to the electric conductive bodies arranged parallel to the widthwise direction of the pre-rolls at predetermined time intervals from the electricity supply means thus bringing the molten resin into contact with surfaces of the pre-rolls by electrostatic pinning, and 4) guiding the molten resin which is brought into contact with the pre-rolls to the continuously fed metal sheet, and pressing and compression-bonding the metal sheet and the organic resin to each other using a pair of lamination rolls arranged directly downstream of the pre-rolls thus laminating the organic resin to the metal sheet.

Figure 1:
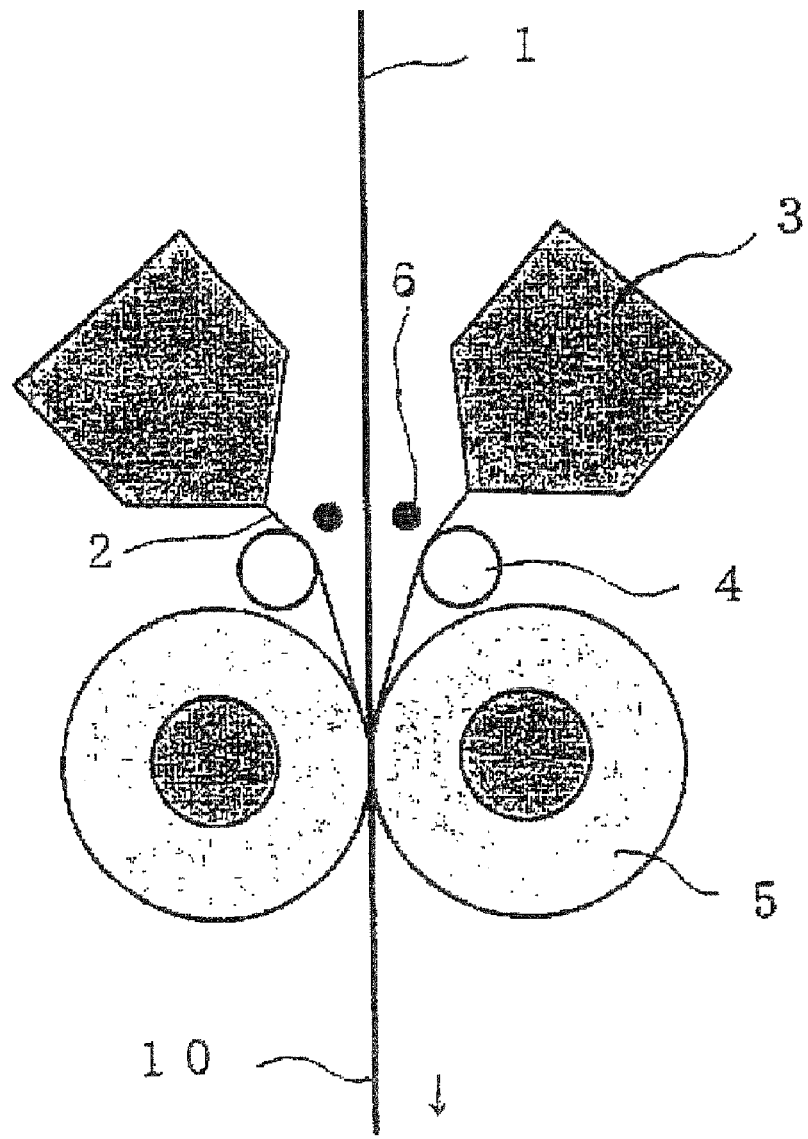
FIG. 1 is a schematic view showing an apparatus of manufacturing an organic resin-coated metal sheet and an example of steps of a method of manufacturing an organic resin-coated metal sheet according to the present invention.
Figure 2:
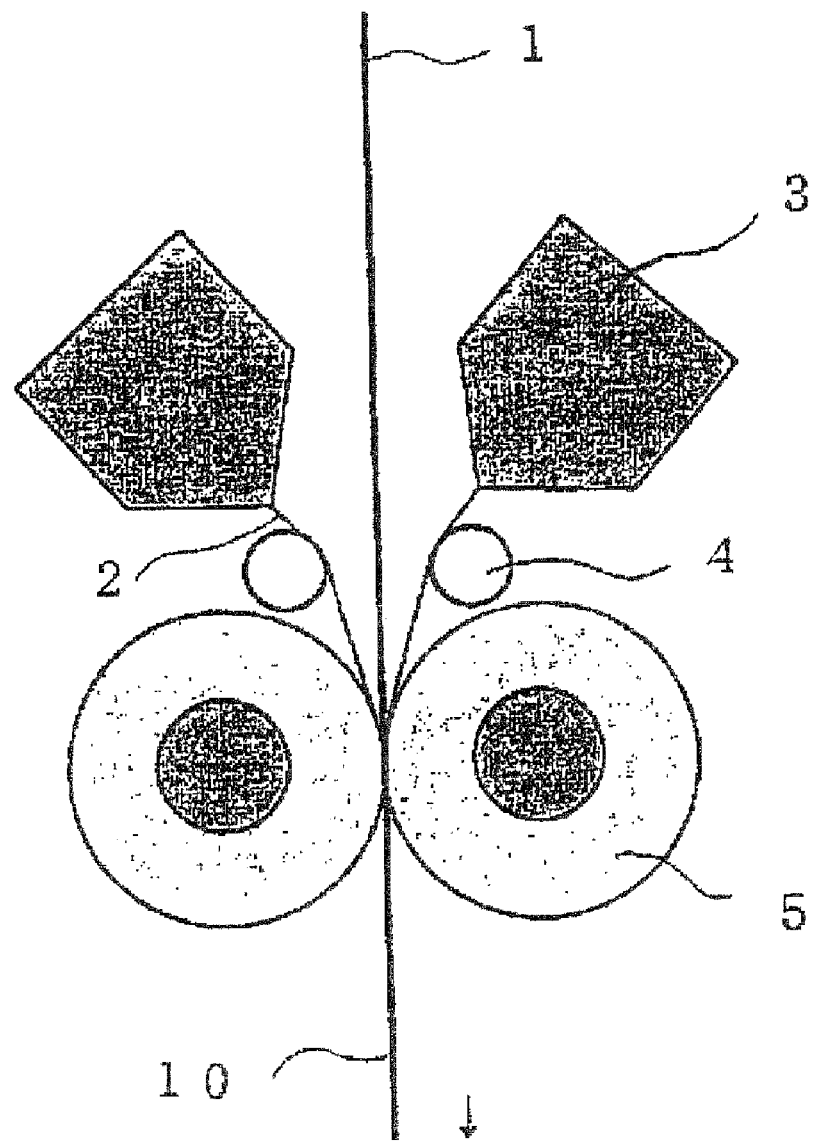
FIG. 2 is a schematic view showing a conventional apparatus of manufacturing an organic resin-coated metal sheet and an example of steps of a conventional method of manufacturing an organic resin-coated metal sheet according to the related art.

In the drawing, numeral 1 indicates a metal sheet, numeral 2 indicates an organic resin, numeral 2a indicates a protruding resin portion, numeral 3 indicates a T-die, numeral 4 indicates pre-rolls, numeral 5 indicates lamination rolls, numeral 6 indicates an electric conductive body, and numeral 10 indicates a resin-coated metal sheet.

BEST MODE FOR CARRYING OUT THE INVENTION

First of all, as a metal sheet used for an organic resin covered metal sheet of the present invention, a surface-treated steel sheet, an aluminum sheet, an aluminum alloy sheet, a stainless steel sheet, a copper sheet, a copper alloy sheet or the like can be used. As the surface-treated steel sheet, a tin sheet, an electrolytic chromated steel sheet, an electrolytic zinc-plated steel sheet, an electrolytic zinc-alloy-plated steel sheet, an electrolytic zinc-cobalt-molybdenum composite plated steel plate, a nickel-plated steel plate, a copper-plated steel plate, a molten zinc-plated steel sheet, a molten zinc-aluminum alloy plated steel sheet, a molten zinc-aluminum-magnesium alloy plated steel sheet, a molten zinc-nickel alloy plated steel sheet, an aluminum-plated steel sheet or the like can be used.

As an organic resin which is applied to the metal sheet, a thermoplastic resin such as a polyester resin constituted of a homopolymer such as polyethylene terephthalate, polybutylene terephthalate or polyethylene naphthalate, a copolymer polyester resin such as copolymer of ethylene terephthalate and ethylene isophthalate, a polyolefin, resin such as polyethylene, polypropylene or ethylene-propylene copolymer, or a polyamide resin such as 6-nylon, 6,6-nylon or 6,10-nylon can be preferably used. Further, to enhance the adhesiveness between the organic resin and the metal sheet, a plurality of resin layers each of which is made of resin having a low melting point may be applied to the metal sheet as the resin layer brought into contact with the metal sheet.

Next, the present invention which uses the above-mentioned constitutional parts is explained in detail in conjunction with drawings. In the present invention, the organic resin-coated metal sheet is manufactured in accordance with the apparatus and steps shown in FIG. 1. That is, an elongated strip-shaped metal sheet 1 is continuously fed from a metals-sheet supply means not shown in the drawing. Using a heating means such as jacket rolls not shown in the drawing, the metal sheet 1 is heated to a temperature which falls within a temperature range equal to or more than a melting temperature of the organic resin to be coated.

The heated metal sheet 1 is fed to T-dies 3 which discharge the organic resin 2 to be coated in a molten state by heating. Here, prior to bringing the organic resin 2 in a molten state by heating into contact with the metal sheet 1, the organic resin 2 is dropped onto and is brought into contact with surfaces of pre-rolls 4 which are arranged between the T-dies 3 and lamination rolls 5. The pre-rolls 4 are provided for making a film thickness of the organic resin 2 uniform by decreasing a neck-in phenomenon of the organic resin 2.

Here, electric conductive bodies 6 made of a metal wire or the like are arranged parallel in the widthwise direction of the pre-rolls 4. When the organic resin 2 in a molten state by heating is dropped onto the pre-rolls 4 in a state that an electric current is supplied to the electric conductive bodies 6 from an electricity supply means for supplying an electric current to the conductors (not shown in the drawing), the organic resin 2 in a molten state by heating is brought into contact with the surfaces of the pre-rolls 4 by electrostatic pinning. Due to such contact between the organic resin 2 and the pre-rolls 4 by electrostatic pinning, an oligomer which is precipitated and laminated to the pre-rolls 4 due to a contact between the oligomer and the organic resin 2 prior to the application of the electric current to the electric conductive bodies 6 is transferred to the organic resin 2 in a molten state by heating and is separated and removed from the surfaces of the pre-rolls 4. Here, the electrostatic pinning is a method which makes use of an electricity charging effect. That is, in manufacturing a film by rapidly cooling a molten metal flowing out from a T-die using a cooling roll in a film manufacturing facility, a high DC voltage is applied to the molten resin film using electrodes for charging molten resin with static electricity.

By performing the application of the DC current to the electric conductive bodies 6 for approximately 1 to 10 seconds at intervals of several hours, the oligomer which precipitates on the pre-rolls 4 within the time can be substantially completely removed. The higher a voltage of the applied electric current, the adhesiveness of the organic resin 2 in a molten state by heating to the pre-rolls 4 is increased. However, when the voltage is excessively high, a spark is generated between the pre-roll 4 and the electric conductive body 6 and hence, the voltage is adjusted to an appropriate value.

A material of the pre-rolls 4 is not specifically limited provided that the material is an electric conductive material. However, by applying a mirror finish to a surface of the pre-roll 4 which is brought into contact with the organic resin 2 in a molten state by heating, the adhesiveness between the organic resin 2 in a molten state by heating and the pre-rolls 4 is increased.

After making the flatness and the thickness of the organic resin 2 uniform by dropping the organic resin 2 onto the pre-rolls 4 and subsequently transferring the oligomer precipitating on the pre-rolls 4 by periodically applying the electrostatic pinning to the organic resin 2, the organic resin 2 is guided onto the metal sheet 1, and the metal sheet 1 and the organic resin 2 are laminated to each other by pressing both of them using the lamination rolls 5. Thereafter, a resin coated steel sheet formed by lamination is cooled by metal-made cooling rolls or the like thus manufacturing a resin-coated metal sheet 10. The application of the DC current is performed between the electric conductive bodies 6 and the metal-made cooling rolls, for example.

Portions of the resin-coated metal sheet 10 coated with the organic resin to which the oligomer is transferred and adhered during the application of the DC current are trivial. Accordingly, in cutting the resin-coated metal sheets 10 as strip materials or in blanking coil-shaped resin-coated metal sheet 10 as members while unwinding the resin-coated metal sheet 10 later, these portions can be removed by off-grade portions. In this manner, it is possible to continuously manufacture the organic resin-coated metal sheet while removing the oligomer precipitated on the pre-rolls thus enhancing the productivity.

EMBODIMENT

Hereinafter, the present invention is explained in detail in conjunction with embodiments.

[Metal Sheet]

As a metal sheet to which an organic resin is applied, an aluminum alloy sheet (kind: JIS 5052 H19, sheet thickness: 0.3 mm) is used.

[Organic Resin]

As an organic resin applied to the metal sheet, the following two-layered copolymer polyester resin (A) and polybutylene terephthalate (B) are used.

<Copolymer Polyester Resin (A)>

Upper layer: (ethylene terephthalate (95 mol %)•ethylene isophthalate (5 mol %), melting temperature: 230° C., IV value: 0.9)

Lower layer: (ethylene terephthalate (85 mol %)•ethylene isophthalate (15 mol %), melting temperature: 215° C., IV value: 0.7)

<Polybutylene Terephthalate (B)> melting temperature: 230° C., IV value: 1.4

Embodiment 1

The above-mentioned two-layered copolymer polyester resin (A) is melted by heating, wherein the upper-layer resin is extruded at a temperature of 270° C. from the T-die and the lower-layer resin is extruded at a temperature of 250° C. from the T-die. Then, the copolymer polyester resin (A) is brought into contact with the pre-rolls having stainless-steel-made mirror surfaces heated to a temperature of 50° C. and, thereafter, is guided to the above-mentioned aluminum alloy sheet heated to 200° C. Both of the metal sheet 1 and the organic resin 2 are nipped, are compression-bonded and laminated to each other using the lamination rolls. Here, copper-made wires having a diameter of 2 mm are extended parallel to the pre-rolls, and a lamination operation is performed while performing the electrostatic pinning by applying a DC current having a voltage of 15V under following conditions.

[Condition 1]

No electrostatic pinning

[Condition 2]

Perform electrostatic pinning for 10 seconds at every 2 hours

When the lamination operation is continuously performed without performing the electrostatic pinning under the condition 1, falling of the oligomer from the pre-rolls starts after approximately 4 hours elapse and a defect is generated on the resin film. On the other hand, when the lamination operation is continuously performed while performing the electrostatic pinning for 10 seconds for every 2 hours under the condition 2, no defect is generated on the resin film and hence, the lamination operation can be continuously performed.

Embodiment 2

The lamination operation is performed in the same manner as the embodiment 1 except for that the above-mentioned polybutylene terephthalate (B) is melted by heating and is extruded from the T-die at a temperature of 270° C. The electrostatic pinning is performed under the following condition.

[Condition 3]

No electrostatic pinning

[Condition 4]

Perform electrostatic pinning for 10 seconds at every 1.5 hours

When the lamination operation is continuously performed without performing the electrostatic pinning under the condition 3, falling of the oligomer from the pre-rolls starts after approximately 2 hours elapse and a defect is generated on the resin film. On the other hand, when the lamination operation is continuously performed while performing the electrostatic pinning for 10 seconds for every 1.5-hour under the condition 4, no defect is generated on the resin film and hence, the lamination operation can be continuously performed.

By adjusting the time intervals for performing the electrostatic pinning depending on the kinds of resins, it is possible to continuously perform the lamination operation without generating the defect on the resin film thus enhancing the productivity of the organic-resin-coated metal sheet.

INDUSTRIAL APPLICABILITY

According to the present invention, in the steps for manufacturing the organic resin-coated metal sheet which includes the steps of: continuously extruding the organic resin in a molten state by heating from the T-die in a film shape onto the elongated strip-shaped metal sheet; dropping the molten resin on the pre-rolls arranged between the T-die and the lamination rolls and bringing the molten resin into contact with the pre-rolls; and pressing the molten resin and the metal sheet by the lamination rolls thus manufacturing the organic-resin coated metal sheet, the electric conductive bodies are arranged parallel to the widthwise direction of the pre-rolls, and the molten resin is dropped onto the pre-rolls in a state that the electric current is supplied to the electric conductive bodies at predetermined time intervals thus bringing the molten resin into contact with surfaces of the pre-rolls by electrostatic pinning whereby the oligomer adhered to the pre-rolls is transferred to the surface of the molten resin and is removed. Accordingly, it is possible to continuously perform the lamination operation while removing the oligomer without stopping the manufacturing steps and without generating a defect on the resin film thus enhancing the productivity of the organic resin-coated metal sheet. Here, the portions of the organic resin-coated metal sheet including the portions formed by transferring the oligomer to the surface of the molten resin can be removed as the off-grade portions.

The invention claimed is:

1. A manufacturing method of an organic-resin coated metal sheet, the manufacturing method comprising the steps of:

continuously extruding an organic resin in a molten state by heating from a T-die in a film shape onto an elongated strip-shaped metal sheet;

dropping a molten resin on pre-rolls arranged between the T-die and lamination rolls and bringing the molten resin into contact with the pre-rolls; and pressing the molten resin and the metal sheet by lamination rolls thus manufacturing the organic-resin coated metal sheet, wherein electric conductive bodies are arranged parallel to the widthwise direction of the pre-rolls, and the molten resin is dropped onto the pre-rolls in a state that an electric current is supplied to the electric conductive bodies at predetermined time intervals thus bringing the molten resin into contact with surfaces of the pre-rolls by electrostatic pinning whereby an oligomer adhered to the pre-rolls is transferred to a surface of the molten resin and is removed.

2. A manufacturing apparatus of an organic-resin coated metal sheet, the apparatus comprising:

a means for feeding a metal sheet;
a means for melting an organic resin by heating;
a T-die;
pre-rolls;
electric conductive bodies arranged parallel in the widthwise direction of the pre-rolls;
an electricity supply means for supplying an electric current to the electric conductive bodies; and
lamination rolls, wherein the organic resin is applied to the metal sheet while removing an oligomer adhered to the pre-rolls by way of following steps 1) to 4);

1) continuously feeding an elongated strip-shaped metal sheet from a means for feeding the metal sheet,
2) discharging the organic resin in a molten state by heating using a heating/melting means from a die lip of the T-die and dropping the molten resin onto surfaces of the pre-rolls arranged directly upstream of the lamination rolls,
3) dropping the molten resin onto the pre-rolls in a state that an electric current is supplied to the electric conductive bodies arranged parallel to the widthwise direction of the pre-rolls at predetermined time intervals from the electricity supply means thus bringing the molten resin into contact with surfaces of the pre-rolls by electrostatic pinning, and
4) guiding the molten resin which is brought into contact with the pre-rolls to the continuously fed metal sheet, and pressing and compression-bonding the metal sheet and the organic resin to each other using a pair of lamination rolls arranged directly downstream of the pre-rolls thus laminating the organic resin to the metal sheet.

* * * * *